Jan. 22, 1957  T. A. HESS ET AL  2,778,053
SEPARABLE HINGED MOUNTING FOR MOTORS OR THE LIKE
Filed Sept. 13, 1954  2 Sheets-Sheet 1

INVENTORS
Theophil A. Hess
Paul B. McKain
By G. Thrall Brewer
Atty

Jan. 22, 1957  T. A. HESS ET AL  2,778,053
SEPARABLE HINGED MOUNTING FOR MOTORS OR THE LIKE
Filed Sept. 13, 1954  2 Sheets-Sheet 2
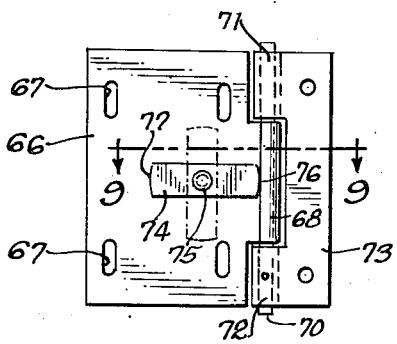
FIG. 8
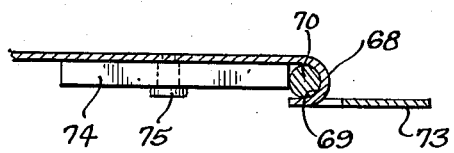
FIG. 9
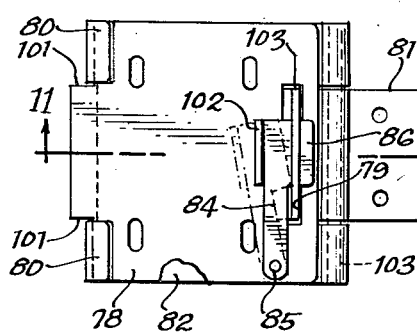
FIG. 10
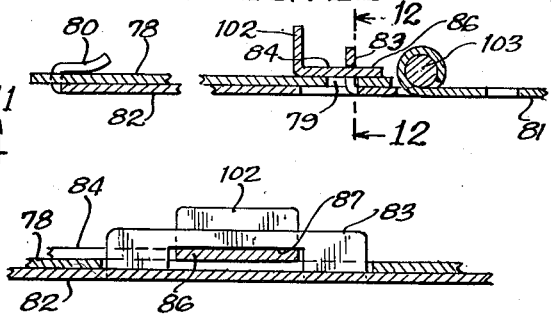
FIG. 11
FIG. 12
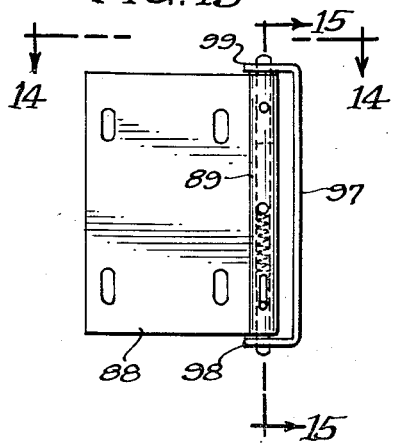
FIG. 13
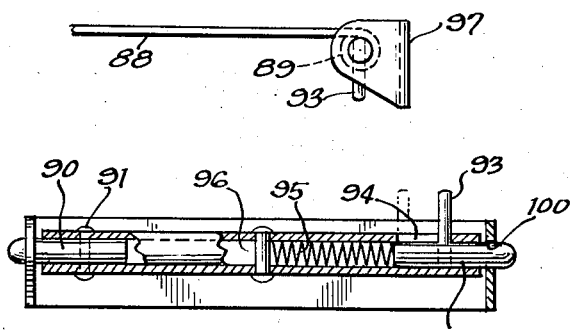
FIG. 14
FIG. 15
INVENTORS
Theophil A. Hess
Paul B. McKain
By G. Thrall Brewer
Atty United States Patent Office 2,778,053
Patented Jan. 22, 1957

2,778,053

SEPARABLE HINGED MOUNTING FOR MOTORS OR THE LIKE

Theophil A. Hess and Paul B. McKain, Chicago, Ill., assignors to Duro Metal Products Co., Chicago, Ill., a corporation of Illinois Application September 13, 1954, Serial No. 455,423

1 Claim. (Cl. 16—171)

This invention relates to separable hinged mountings for motors or the like and is particularly useful in power tools wherein one motor is to be used interchangeably with a number of such power tools by taking the motor from one of a group of tools and applying it to another tool in the group.

The principal object of this invention is the provision of a separable hinged mounting for a motor or the like which may be readily locked in assembled relation by a manual manipulation of a pin, latch or other locking device as distinguished from an automatic latching operation.

A more specific object of this invention is the provision of a latching means for a separable hinged mounting for a motor or the like wherein the operator is made aware of the condition of the latching device by a rather considerable displacement of the device from its latched position and can readily determine whether the device is in fact latched.

Another object of this invention is the provision, in a separable hinged mounting for a motor or the like, of a pin adapted to be moved by spring pressure axially across the path of movement of one of the hinged members as it is separated from the other hinged member, the pin being adapted to pass through an opening in a wall forming part of one of the hinge members and constituting one of a pair of supports for the pin.

These and other objects of this invention will become apparent from the following detailed description when taken together with the accompanying drawings in which:

Fig. 8 is a plan view of a third modification of a separable hinge mounting showing a rotatable locking means for the mounting;

Fig. 9 is an enlarged fragmentary elevational view of the locking means of Fig. 8 taken substantially along the line 9—9 thereof;

Fig. 10 is a plan view of a fourth modification showing a hook type locking means;

Fig. 11 is an enlarged elevational view of the mounting of Fig. 10 looking in the direction of the arrows 11—11 of Fig. 10, and illustrating the limited swinging movement available with this type of mounting;

Fig. 12 is an enlarged side elevational view of a portion of the locking means of Fig. 10; and Figs. 13, 14 and 15 are respectively a plan view, an enlarged inverted rear elevational view taken on the line 14—14 of Fig. 13 and a side elevational view in section taken on line 15—15 of Fig. 13 of a fifth modification of the mounting.

Figure 1:
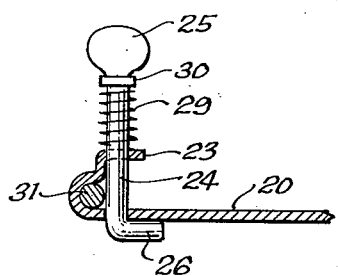
Fig. 1 is a side elevational view in section of a fragment of a hinged mounting showing the mounting assembled with respect to its hinge pin.
Figure 3:
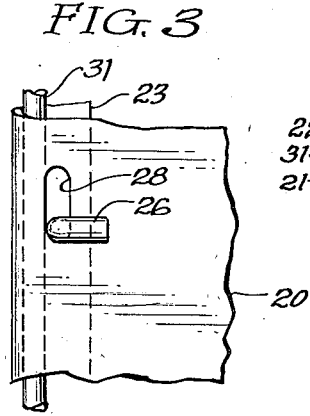
Fig. 3 is a bottom view of the pin and mounting shown in Fig. 1.
Figure 2:
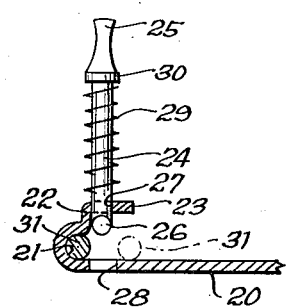
Fig. 2 is a view similar to Fig. 1 showing the pin in an open position to permit the mounting to be separated.

Referring now to the drawings for a detailed description of the invention, and particularly to Figs. 1, 2 and 3, the mounting therein depicted is comprised of a plate 20 to which a motor, not shown, may be bolted or otherwise secured. Plate 20 has its left-hand end region, as viewed in Figs. 1 to 3, inclusive, bent upwardly and backwardly to form a semi-circular groove 21, and then is bent upwardly and finally horizontally substantially parallel to the general plane of plate 20, to form a shoulder 22 and a retaining wall 23 for supporting the locking mechanism.

The locking mechanism is comprised of a pin 24 having a broad flat upper end 25 by which it may be grasped and turned by the operator, and a hook 26 formed at the opposite end thereof. The pin passes through an opening 27 in retaining wall 23 and through an elongated slot 28 in plate 20 disposed opposite opening 27. Slot 28 is made sufficiently long to receive hook 26 when pin 24 is turned to align the hook with the slot.

Shoulder 22 is disposed substantially adjacent opening 27 so that hook 26 will be compelled to assume a position substantially parallel with the elongated slot 28 when pin 24 is in its raised position. The shoulder is made sufficiently wide so that when hook 26 abuts the underside of wall 23, the space between the lower end of hook 26 and the upper surface of plate 20 as viewed in Figs. 1 and 2 is substantially equal to or slightly greater than the width of groove 21. A spring 29, preferably of the helical type encircles pin 24 and is compressed between a shoulder 30 disposed at the juncture between flattened end 25 and pin 24 and the upper surface of retaining wall 23 so that the spring normally tends to raise and hold the pin with its shoulder 26 abutting on the underside of retaining wall 23, substantially as shown in Fig. 2.

A hinge pin 31 which may be fixed to a machine frame (not shown) or the like is adapted to be received in groove 21 so that plate 20 may be mounted upon and swung around said pin. Hinge pin 31 is locked in groove 21 by pin 24 when the latter occupies the position shown in Figs. 1 and 3. In that position the body of the pin 24 passes through opening 27 and slot 28, and hook 26 is disposed transversely of the axis of slot 28 as shown in Fig. 3 to prevent pin 24 from moving back upwardly to the position shown in Fig. 2 under the action of spring 29. The force of spring 29 will hold hook 26 frictionally against the bottom surface of plate 20 to resist turning of the hook into alignment with slot 28.

When it is desired to remove plate 20 from hinge pin 31 to transfer the motor mounted thereon to some other tool or location, pin 24 is turned by means of the flat end 25 until hook 26 is aligned with slot 28, whereupon spring 29 will pull hook 26 through slot 28, past hinge pin 31 and up against the under surface of retaining wall 23. Plate 20 may then be moved to the left as viewed in Figs. 1, 2 and 3 until hinge pin 31 occupies a position substantially corresponding to the dotted position shown in Fig. 2, whereupon plate 20 is free of pin 31 and may be moved bodily relative thereto. To assemble plate 20 relative to a hinge pin 31, the plate is first located with its upper surface (Figs. 1 and 2) bearing against pin 31 and then is moved to the right as viewed in Figs. 1, 2 and 3 until pin 31 is disposed in groove 21, whereupon pin 25 is depressed to cause hook 26 to pass through slot 28. When hook 26 is entirely free of slot 28, pin 24 is turned 90° and downward pressure on the pin is then released to permit spring 29 to hold the hook against the under surface of plate 20 as aforesaid.

Figure 4:
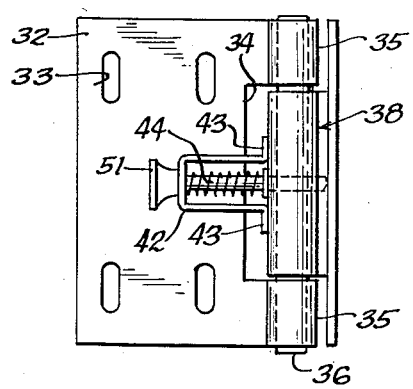
Figs. 4 and 5 are respectively a plan view and an enlarged elevational view in section of a modification of the pin type locking means of Figs. 1 to 3, inclusive.
Figure 5:
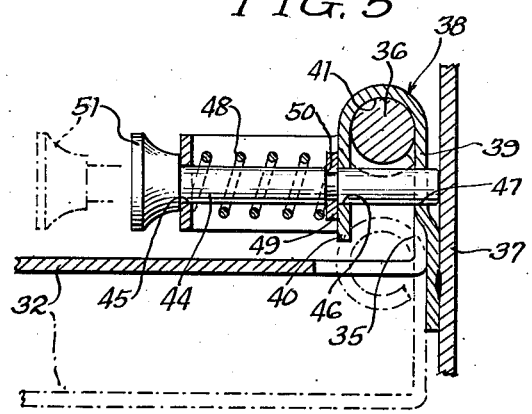

The form shown in Figs. 4 and 5 differs from the one just described in that the hinge pin is affixed to the plate on which the motor is mounted and hence is movable therewith while the latching pin remains with the fixed portion of the mounting. Thus in Fig. 4 a mounting plate 32 is shown having slots 33 therein spaced in accordance with the NEMA code for electric motor mountings to receive bolts by which a motor may be mounted to said plate 32. The right-hand region of plate 32 as viewed in Fig. 4 has a relatively long and shallow notch 34 formed therein, the remaining portion of the right-hand region being bent upwardly as shown in Fig. 5 to form upstanding fingers 35, the free ends of which are curled around and secured to a hinge pin 36. Thus pin 36 is a permanent part of mounting plate 32.

The fixed portion of the separable mounting may comprise a frame 37 to which is welded or otherwise secured a sheet metal hook 38 having a region 39 thereof offset from the plane of the region secured to frame 37. The free end 40 of the hook extends downwardly in parallel relation with the plane of offset region 39 to form therebetween an elongated groove 41.

A U-shaped strap 42 having diverging ends 43, by which it is secured to free end 40 of hook 38, is disposed substantially midway of the ends of hook 38 and extends to the left thereof as viewed in Figs. 4 and 5. A locking pin 44 passes through an opening 45 in the flat or web portion of strap 42 and also through aligned openings 46 and 47 in end 40 and offset region 39, respectively, of hook 38. Said pin 44 is axially reciprocable in openings 45 and 46 to permit its right hand end, as viewed in Figs. 4 and 5, to be retracted from opening 47 and out of groove 41. It may be observed that pin 44, when disposed in openings 46 and 47, effectively locks hinge pin 36 in groove 41, and when pin 44 is withdrawn so that it no longer extends in groove 41, hinge pin 36 is then free to move downwardly through slot 41 until it is entirely free thereof, whereupon plate 32 and the motor mounted thereon may be moved to another machine or location.

A helical spring 48 encircles locking pin 44 and is compressed between the inside surface (right-hand surface as viewed in Figs. 4 and 5) of the web portion of the U-shaped strap 42 and an abutment on pin 44 in the form of a washer 49 retained in a peripheral groove 50 in pin 44. Spring 48 thus continuously urges pin 44 to the right to assume the position shown in Figs. 4 and 5. Pin 44 may be withdrawn to free hinge pin 36 by pulling the protruding knob 51 to the left against the action of spring 48 to the dotted position shown in Fig. 5.

The movement of pin 44 to the right as viewed in Figs. 4 and 5 may be limited either by having the free right-hand end thereof abut against frame 37, or by having washer 49 abut against the free end 40 of hook 38, or by having knob 51 strike the connecting or web portion of strap 42.

Figure 6:
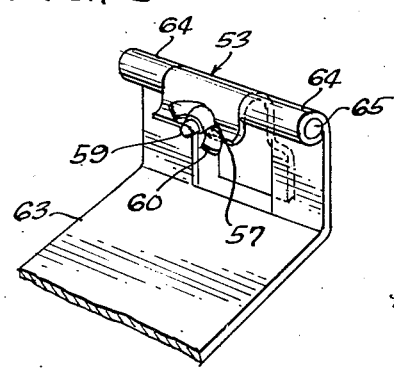
Figs. 6 and 7 are a perspective view and an enlarged side elevational view in section of a second modification of the hinge pin, showing a second modification of the hinged mounting in locked and unlocked conditions, respectively.
Figure 7:
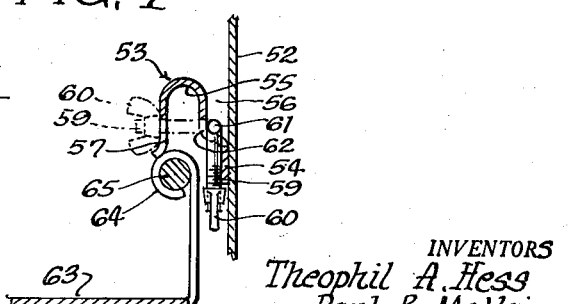

The modification shown in Figs. 6 and 7 is similar to the one shown in Figs. 4 and 5 except that the spring biased locking pin has been replaced by a bolt and a wing nut, the bolt being slidable in a slot so that it can be pivoted out of the way of the hinge pin.

Referring now to Figs. 6 and 7 there is shown a machine frame 52 to which may be affixed a hook 53 by welding or other means, the hook 53 being similar in form to hook 38 of Fig. 5. Thus the end 54 of the hook is secured to frame 52, and elongated groove 55 is offset from the plane of end 54 to provide a space 56 between the outer surface of the hook and frame 52. A notch 57 is formed in the depending end 58, the purpose of which is to receive a hook bolt 59 on the outer end of which is threaded a wing nut 60. The hook portion 61 of bolt 59 extends through a slot 62 in the offset portion of the hook 53 into the space 56 between the hook and frame.

The plate 63 on which the motor may be mounted is similar in all respects to plate 32 of Fig. 5 and is provided with a pair of spaced fingers 64 disposed one on either side of hook 53 and curled at their free ends to receive a hinge pin 65. The pin 65 is permanently secured to the curled ends of the fingers and movable therewith.

In operation, plate 63 and its motor will be assembled relative to hook 53 by inserting the free portion of hinge pin 65 between hook bolt 59 and the open end of hook 53, and then raising the pin until it is received within groove 55. The depending end of hook bolt 59 is then pulled outwardly and upwardly through the space between the fingers 64 until the bolt is received in notch 57. Wing nut 60 is tightened on the bolt until the bolt is held securely in place, that is, in bridging relation across the free end of groove 55.

To disassemble a motor and its mounting plate 63 from the support of Figs. 6 and 7, wing nut 60 is backed off the free end of bolt 59 until it is able to clear slot 57 and drop down to substantially the position shown in Fig. 7. Plate 63 with its attached hinge pin 65 is then lowered through the space between the free end of groove 55 and hook bolt 59 until it is clear, whereupon it may be removed to another machine or location.

Another modification is shown in Figs. 8 and 9. In this modification the hinge pin is part of the stationary structure and the plate supporting the motor is hooked over and latched with respect to the hinge pin somewhat in the fashion of Figs. 1, 2 and 3.

In Fig. 8 the motor mounting plate is shown at 66 and is formed with the aforesaid motor mounting slots 67 corresponding to slots 33 in Fig. 4. The upper and lower right-hand corners of plate 66 as viewed in Fig. 8 are notched and the remaining central portion 68 is curled over to form an elongated groove 69 for the reception of a hinge pin 70. The hinge pin is received within the curled ends of spaced fingers 71 and 72 extending from the stationary plate 73 of the mounting, it being understood that the stationary plate may be secured by any suitable means to a machine frame or the like. The spacing between fingers 71 and 72 is equal to or slightly greater than the length of the central portion 68 of mounting plate 66 so that should the mounting be disposed with the axis of hinge pin 70 vertical, one or the other of the fingers 71, 72 may be utilized as a bearing support for the mounting.

Hinge pin 70 is retained in groove 69 by a pivoted latch 74 which bears frictionally against the underside of plate 66 to prevent free rotation thereof about its pivot pin 75. Other means may be employed to provide sufficient resistance to rotation of latch 74 about its pin 75 to enable it to remain in any given position irrespective of vibration or accidental shock or jar which may be imposed upon the latch. The length of the latch from the axis of pivot pin 75 to the end thereof is calculated to be such as to impose a slight pressure upon pin 70 by the end of the latch contacting said hinge pin. The ends of the latch 76 and 77 are arcuate in contour, the center of curvature coinciding with the axis of pin 75.

To assemble plate 66 relative to the stationary plate 73, latch 77 is turned from the solid position shown in Fig. 8 to approximately the dotted position shown therein, and the central portion 68 is hooked over pin 70. Latch 74 is then rotated until one end firmly abuts against hinge pin 70. In disassembling the mounting 66 from stationary plate 73 the same steps are performed in reverse order.

Should the frictional force developed between the end of latch 74 and pin 70 interfere with the swinging movement of plate 66 about stationary hinge pin 70, it may be desirable to provide said hinge pin 70 with freedom of movement about its own axis in fingers 71 and 72 while at the same time restraining axial movement of said pin relative to these fingers. It is believed that various means for accomplishing this effect will be apparent to those skilled in the art and hence need not be detailed here.

The modification shown in Figs. 10, 11 and 12 differs from the preceding modifications in that the hinge per se is not separable, but a motor mounting plate is removably mounted on the swinging part of the hinge by a hook engaging a slot in the swinging hinge part. Thus in Fig. 10 the motor mounting plate is shown at 78 and is formed with a rectangular slot 79 in the central right hand region thereof as viewed in Fig. 10 and with a tongue 101 extending from the left hand edge of the plate. The hinge is comprised of a stationary part 81 fixed to the machine frame and a part 82 adapted to swing about a hinge pin 103 supported by part 81. Hinge part 82 has an elongated rectangular tab 83 extending outwardly substantially at right angles to the plane of part 82 and disposed to the right and center of said part. It is contemplated that tab 83 will extend through rectangular opening 79 in plate 78.

Motor mounting plate 78 is secured to part 82 by a hook 84 pivoted on plate 78 at 85 and having its hooked end 86 disposed to enter elongated slot 87 in tab 83. An upstanding flange 102 is formed on hook 84 by which the hook may be manipulated. It is contemplated that when hooked end 86 engages, or is received in, slot 87, the right hand end of plate 78 will be effectively locked to hinge part 82.

The left hand end of plate 78 (Figs. 10 and 11) will be locked to hinge part 82 by a pair of spaced hooks 80, preferably formed as integral upwardly and backwardly bent tabs on part 82. Tongue 101 is received between the hooks and assists in locating plate 78 on part 82. The corners of plate 78 are received within hooks 80 when tab 83 extends through opening 79.

In assembling plate 78 on part 82, tongue 101 is first inserted between hooks 80, and the plate is slid in the direction of the hooks until the left hand edges of the plate are retained in hooks 80. The plate is then lowered over tab 83 and pivoted hook 84 is rotated into slot 87 to lock plate 78 to hinge part 82.

It is contemplated that hook 84 will be mounted on plate 78 in such manner as to provide a frictional resistance to rotation of the hook about its pivot 85. Thus when hook 84 is inserted in slot 87, it will remain there despite any vibration or shock which may be imparted to mounting 78. It may be apparent that hook 84 may take various forms to render it readily manipulatable without departing from the spirit of the invention.

The form shown in Figs. 13, 14 and 15 differs from the preceding forms in that the pivot pin itself is made in two parts so that it may be expanded into spaced openings provided therefor and held in the expanded position by resilient means during the operation of the mounting. Referring to Fig. 13, the motor mounting plate is shown at 88 and has its entire right-hand edge curled over as shown at 89 in Fig. 14. Within curled edge 89 are mounted two hinge pins in coaxial relation, the left hand pin 90 being fixed to end 89 by a rivet 91 or the like, and the right-hand pin 92 being reciprocable axially in said curled end 89. A pin 93, pressed into a suitable opening therefor in right-hand hinge pin 92 extends radially outwardly therefrom through a slot 94 in curled end 89 and provides a means by which hinge pin 92 may be manually reciprocated in the curled edge. A spring 95 is disposed between the inner end of pin 92 and an abutment 96, preferably in the form of a rivet extending through curled edge 89, and is initially in compression so that it exerts a continuous force on hinge pin 92 tending to urge it to the right as viewed in Fig. 15 out of curled edge 89.

The stationary portion of the hinge mounting is a stamped bracket 97 which may be permanently secured to a machine frame or the like and is provided with a pair of parallel spaced arms 98 and 99 adapted to embrace curled edge 89. Each arm 98 and 99 has an opening 100 therein through which the adjacent hinge pin may extend.

It is contemplated that plate 88 will be assembled relative to bracket 97 by manually moving pin 92 inwardly with the aid of pin 93 until the curled edge 89 can be inserted between arms 98 and 99. The plate is then adjusted relative to openings 100 until the free ends of hinge pin 90 and 92 extend through said openings 100. Spring 95 being in compression, hinge pin 92 will readily snap into its opening 100. The removal of a plate 88 from a bracket 97 is accomplished merely by manually moving pin 93 to the left as viewed in Fig. 15 until the end of hinge pin 92 clears the inner end of opening 100, whereupon plate 88 is simply pivoted around the still assembled free end of hinge pin 90 and its opening 100 until plate 88 clears arm 98. A slight lateral movement of the plate relative to bracket 97 in a direction parallel with the axis of pins 90 and 92 will serve to free pin 90 entirely from its opening 100. The plate 88 and its attached motor (not shown) may then be transferred to another machine or location.

It is obvious that in the Figs. 13, 14 and 15 modification hinge pin 90 may be made reciprocable in curled end 89 in precisely the same manner as pin 92 if it is desired to provide a closer fit between arms 98 and 99 and the curled edge 89.

It is understood that the foregoing description is merely illustrative of preferred embodiments of the invention and that the scope of the invention therefore is not to be limited thereto but is to be determined by the appended claim.

We claim:

A separable mounting for a motor or the like comprising a part having a broad hook formed thereon, a second part having a hinge pin secured thereto in a manner to leave a free span of the pin, said free span being adapted to be received in the hook, and cylindrical means for retaining the pin in the hook, said means being mounted on the part having the hook and being shiftable across the open end of the hook to a position wherein its axis is disposed transversely of the axis of the pin to prevent egress of the pin from the hook, said hook having a groove across the bottom thereof within which the free span of the pin is received and a shoulder adjacent the groove, and an opening in the end region of the hook aligned with a slot in the body of the hook; and the cylindrical means for retaining the pin in the hook comprising a rod received in the opening and having one end bent to form a hook which is adapted to pass through the slot in the broad hook and to be turned relative to said slot, said shoulder being of substantially the same thickness as the bent end of the rod whereby said bent end may be held out of the path of movement of the pin as it enters or leaves the groove.

References Cited in the file of this patent

UNITED STATES PATENTS

| | | |
|---|---|---|
| 719,758 | Custer | Feb. 3, 1903 |
| 789,008 | Crane et al. | May 2, 1905 |
| 1,135,767 | Cheshire | Apr. 13, 1915 |
| 1,331,678 | Schultz | Feb. 24, 1920 |
| 1,410,650 | Caps | Mar. 28, 1922 |
| 1,578,408 | Diday | Mar. 30, 1926 |
| 1,886,259 | Liebernecht | Nov. 1, 1932 |
| 2,131,802 | Harmon | Oct. 4, 1938 |
| 2,497,337 | Ackerman | Feb. 14, 1950 |
| 2,507,329 | Bailey | May 9, 1950 |
| 2,663,585 | Tye | Dec. 22, 1953 |